US008584215B2

(12) United States Patent
Narasimha et al.

(10) Patent No.: US 8,584,215 B2
(45) Date of Patent: Nov. 12, 2013

(54) SYSTEM AND METHOD FOR SECURING DISTRIBUTED EXPORTING MODELS IN A NETWORK ENVIRONMENT

(75) Inventors: Maithili Narasimha, Sunnyvale, CA (US); Suraj Nellikar, San Jose, CA (US); Srinivas Sardar, Fremont, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 13/368,095

(22) Filed: Feb. 7, 2012

(65) Prior Publication Data
US 2013/0205376 A1    Aug. 8, 2013

(51) Int. Cl.
*H04L 29/06*    (2006.01)
*G06F 21/00*    (2013.01)

(52) U.S. Cl.
USPC ............................................................ 726/6

(58) Field of Classification Search
None
See application file for complete search history.

(56) References Cited

U.S. PATENT DOCUMENTS

| | | | |
|---|---|---|---|
| 8,069,470 B1 * | 11/2011 | Montenegro | ....................... 726/3 |
| 8,335,160 B2 | 12/2012 | Carvalho et al. | |
| 2006/0149848 A1 * | 7/2006 | Shay | .............................. 709/229 |
| 2007/0171827 A1 | 7/2007 | Scott et al. | |
| 2007/0217425 A1 | 9/2007 | Claise et al. | |
| 2008/0235769 A1 * | 9/2008 | Purcell et al. | ...................... 726/3 |
| 2009/0228586 A1 | 9/2009 | Claise et al. | |
| 2013/0136128 A1 | 5/2013 | Robinson et al. | |

OTHER PUBLICATIONS

U.S. Appl. No. 13/288,417, filed Nov. 13, 2011, entitled "Distriuted Network Flow Exporter," Inventors: Akshya K. Singh, et al.
B. Claise, "Cisco Systems NetFlow Services Export Version 9," RFC 3954, Cisco Systems, Inc., Oct. 2004, 34 pages; http://www.ietf.org/rfc/rfc3954.txt.
"Cisco NetFlow Services Solutions Guide," Cisco Systems, Inc., Jan. 22, 2007; 72 pages http://www.cisco.com/en/US/docs/ios/solutions_docs/netflow/nfwhite.html.

* cited by examiner

*Primary Examiner* — Gilberto Barron, Jr.
*Assistant Examiner* — Malcolm Cribbs
(74) *Attorney, Agent, or Firm* — Patent Capital Group

(57) ABSTRACT

A method is provided in one example implementation and includes identifying a plurality of exporters that are authorized to communicate data to a collector on behalf of a secure domain; generating secure credentials for the secure domain; communicating the secure credentials to the collector; and authenticating the exporters using the secure credentials. In more particular implementations, the method can include receiving the secure credentials; receiving certain data that includes identifying information, which further includes an Internet protocol (IP) address of a source associated with the certain data; accepting the certain data if the secure credentials validate the identifying information; and rejecting the certain data if the secure credentials do not validate the identifying information.

18 Claims, 4 Drawing Sheets

SYSTEM AND METHOD FOR SECURING DISTRIBUTED EXPORTING MODELS IN A NETWORK ENVIRONMENT

TECHNICAL FIELD

This disclosure relates in general to the field of communications and, more particularly, to a system and a method for securing distributed exporting models in a network environment.

BACKGROUND

A virtualization trend in the information technology (IT) arena is driving the development of many virtualization technologies. Network virtualization solutions can consolidate multiple physical networks into one virtual network. They can also logically segment a single physical network into multiple logical networks. Partitions can be added to rapidly scale the network for various needs. Network virtualization represents a new IT paradigm that challenges existing physical network deployment models. Network virtualization offers many benefits such as expanding the availability of single IT assets to multiple users, managing multiple IT assets as a single resource, providing dedicated virtual networks for applications, etc. Additionally, network virtualization (when properly deployed) can lead to revenue generation, expense reduction, better system performance, and increased customer satisfaction.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

DETAILED DESCRIPTION OF EXAMPLE EMBODIMENTS

Overview

A method is provided in one example implementation and includes identifying a plurality of exporters that are authorized to communicate data to a collector on behalf of a secure domain; generating secure credentials for the secure domain; communicating the secure credentials to the collector; and authenticating the exporters using the secure credentials. In more particular implementations, the method can include receiving the secure credentials; receiving certain data that includes identifying information, which further includes an Internet protocol (IP) address of a source associated with the certain data; accepting the certain data if the secure credentials validate the identifying information; and rejecting the certain data if the secure credentials do not validate the identifying information.

The secure credentials can comprise a list of Internet Protocol (IP) addresses of the exporters, where the secure credentials can validate the identifying information if the IP address of the source is included in the list of IP addresses. Objects in the list can include an IPv4 address, an IPv6 address, an X.509 element, etc. The secure credentials can include a security certificate with a group public key identifying the secure domain, where a digital signature is created with a private key, and the secure credentials validate identifying information that is received if the digital signature can be verified with the group public key.

In other example embodiments, the method can include communicating the private key to the exporters. The exporters are configured for storing the private key; creating the digital signature with the private key; and signing the data with the digital signature. The private key is communicated as part of a feature configuration of the exporters. The identifying can be performed at a controller in a distributed virtual switch (DVS) network environment. In certain example architectures, the controller can be associated with a virtual supervisor module (VSM). Additionally, the exporters can be associated with respective virtual Ethernet modules (VEMs) in the DVS network environment.

Example Embodiments

Figure 1:
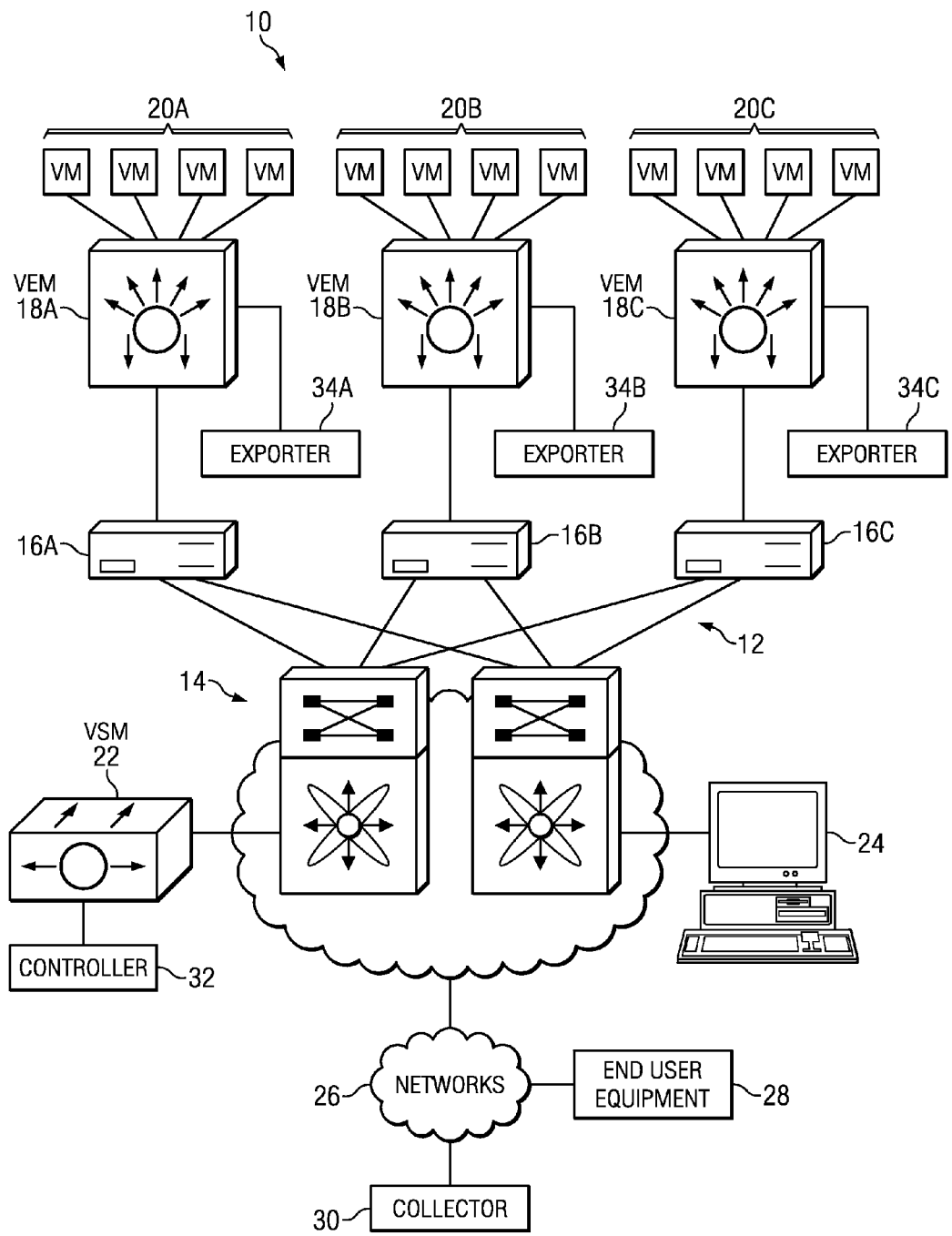
FIG. 1 is a simplified block diagram illustrating a system for securing distributed exporting models in a network environment in accordance with one embodiment.

Turning to FIG. 1, FIG. 1 is a simplified block diagram illustrating a system 10 for securing distributed exporting models in a network environment in accordance with one embodiment of the present disclosure. FIG. 1 includes a virtual network 12 that includes one or more instances of a distributed virtual switch (DVS) 14, and one or more servers such as servers 16a, 16b, and 16c. Virtual network 12 is generally represented by a plurality of communication links, which may be wired or wireless. DVS 14 may span many servers (e.g., servers 16a-c), functioning as a single virtual switch across associated hosts in virtual network 12. Servers 16a, 16b, and 16c may be provisioned with Virtual Ethernet Modules (VEMs) 18a, 18b, and 18c, respectively. VEMs 18a, 18b, and 18c provide advanced networking capability to one or more virtual machines (VMs) 20a, 20b, and 20c.

DVS 14 may be provisioned with a Virtual Supervisor Module (VSM) 22 that controls one or more VEMs (e.g., VEM 18a-c) as one virtual switch. VEMs 18a-c may be configured through VSM 22 to perform Layer 2 switching and advanced networking functions such as port-channel activities, quality of service (QoS), security (e.g., private virtual local area network (VLAN), port security, etc.), and monitoring (e.g., Netflow, switch port analyzer (SPAN), encapsulated remote SPAN, etc.). Network administrators can define configurations on the VEMs (e.g., 18a-c) in virtual network 12 from a single interface coupled to VSM 22. In the embodiment illustrated in FIG. 1, VSM 22 may be integrated with a server 24, which provides a single console to operate and to manage VSM 22.

Virtual network 12 may be a private network, for example, a data center network in certain implementations of the present disclosure. VMs (e.g., VMs 20a-c) in virtual network 12 may communicate with an instance of end user equipment 28 over other networks 26. It should be noted that multiple instances of end user equipment may readily communicate with virtual network 12 over networks 26. Networks 26 may include public and/or private networks. According to embodiments of the present disclosure, a plurality of network flows may be exchanged between end user equipment 28 and virtual network 12 over networks 26. Each of the individual network flows may be monitored and statistics (e.g., Netflow statistics such as flow start and end times, number of packets sent, etc., access control list logs, etc.) on each network flow may be periodically exported to a collector 30. Collector 30 is configured to receive data such as network flow records (e.g., records that provide information about a network flow observed at an observation point in a network) from one or more exporters and subsequently process (e.g., parse, store, analyze, aggregate, etc.) the received export packet(s). By analyzing the network flow statistics, network operators can get a "big picture" of network volume and flow, packets accepted or denied by Internet Protocol (IP) access lists, etc., and then address any network deficiencies such as traffic bottlenecks, improper packet dropping, etc.

According to embodiments of the present disclosure, VSM 22 may be provisioned with a controller 32. A control protocol message exchange between controller 32 and collector 30 may define a secure domain, which includes authorized entities that may send network flow information and other data to collector 30 on behalf of DVS 14. Each of VEMs 18a-c may be provisioned with exporters 34a-c, respectively. Exporters 34a-c may be part of the secure domain and, further, authorized to send data to collector 30. As used herein, "data" includes any type of numeric, voice, video, or script file, any type of source or object code, any type of packet information, or any other suitable information in any appropriate format that may be communicated from one point to another in electronic devices and/or networks.

Exporters 34a-c may be configured to monitor network packets entering an observation point in virtual network 12, define flows (e.g., a set of Internet Protocol (IP) packets having a set of common properties derived from the data contained in the packet) from these packets, create flow records, and export the flow records directly to one or more collectors (e.g., collector 30). Collector 30 may validate the identity of the exporters using information supplied by controller 32. Controller 32, exporters 34a-c, and collector 30 may thus cooperate to secure the distributed exporting model of system 10 for network flow and other monitoring services in distributed virtual switch platforms (e.g., Cisco® Nexus 1000v) to protect against masquerade and replay attacks.

According to embodiments of the present disclosure, collector 30, controller 32, and exporters 34a-c are network elements configured with appropriate hardware and software components to perform their intended functionalities. As used herein, the term "network element" is meant to encompass computers, network appliances, servers, routers, switches, gateways, bridges, loadbalancers, firewalls, processors, modules, or any other suitable device, proprietary component, element, or object operable to exchange information in a network environment. Moreover, the network elements may include any suitable hardware, software, components, modules, interfaces, or objects that facilitate the operations thereof. This may be inclusive of appropriate algorithms and communication protocols that allow for the effective exchange of data or information.

For purposes of illustrating the techniques of system 10, it is important to understand the communications propagating in a given system such as the architecture shown in FIG. 1. The following foundational information may be viewed as a basis from which the present disclosure may be properly explained. Such information is offered earnestly for purposes of explanation only and, accordingly, should not be construed in any way to limit the broad scope of the present disclosure and its potential applications.

In a typical switch that is not designed for virtualization, each line card (LC) in the switch maintains a cache to store network flow statistics and other data. Each LC is also connected to a hardware supervisor module by way of a hardware backplane connection. The LCs export their data through the backplane to the hardware supervisor module. The hardware supervisor module forwards the data collected from multiple LCs to the collector as a single switch. This type of network flow statistics export does not pose a burden for the hardware supervisor module due to the hardwired connections through the backplane that provide a direct one-to-one LC-to-hardware supervisor module connection.

However, in a virtual network environment (e.g., such as a DVS), traffic is routed at the L2/L3 layer, instead of a direct point-to-point connection. The DVS has a set of virtual networking elements that networks the virtual machines (e.g., VMs 20a-c), like physical machines are networked in a physical environment. The virtual environment provides networking elements similar to those in the physical environment such as virtual line cards (virtual LCs), switches, port groups, etc. The virtual LCs can be configured as exporters (e.g., exporters 34a-c), capable of exporting network flow statistics and other data. The guest operating system and application programs of the VMs communicate with the exporter through a device driver, with communication in the guest operating system occurring just as it would with a physical device. Outside the VM, the exporter may have its own Media Access Control (MAC) address and one or more IP addresses. The exporter responds to standard Ethernet protocol, as would a physical LC. An outside agent does not detect that it is communicating with a virtual (and not physical) machine.

A virtual switch in such a virtual network environment operates like a Layer 2 physical switch. On one side of the virtual switch are port groups that connect to VMs. On the other side are uplink connections to physical Ethernet adapters on the host servers. VMs connect to the physical environment through the physical Ethernet adapters that are connected to the virtual switch uplinks. A DVS is a virtual switch that can connect to multiple VMs through distributed port groups. The DVS can route traffic internally between VMs or link to an external network (e.g., networks 26) by connecting to suitable physical Ethernet adapters.

In the DVS, data is exchanged between VEMs (e.g., 18a-c) and the VSM (e.g., VSM 22) at the L2/L3 levels without the benefit of a one-to-one physical hardware connection. For example, each of the exporters supporting a VEM (e.g., VEM 18a-c) collects network flow statistics for flows passing through the exporter. The network flow statistics are routed to the VSM (e.g., VSM 22), which processes the network flow statistics packets as a router, thereby imposing a heavy processing burden on the VSM. Further, the VSM becomes a single point of failure, and when it is reloaded, pending batches of network flow statistics may be lost.

To alleviate such problems, instead of a single point exporter by the VSM, the DVS can include multiple distributed exporters without overburdening the VSM. In such a distributed exporter model, each exporter exports its own network flow cache directly to the collector (e.g., collector 30), with only limited supervisor functions for the export provided by the VSM (e.g., VSM 22). However, in the DVS where the exporters are distributed over L2/L3 networks, a number of scalability challenges arise that are not faced by traditional physical environments. As one example, in a typical network flow solution, network elements are configured to gather network flow data and export it to the collector(s) through a single centralized entity for each switch. The collector may identify the exporter through its IP address. In a physical switch, typically, the exporter is a single entity that exports the data monitored on its interfaces (e.g., the observing domain) on behalf of the network. In contrast, in a DVS network environment, exporters are distributed across the network over multiple VMs. A centralized model (e.g., where data to the collector comes from a single, centralized entity on behalf of the network) does not scale in distributed environments. Moreover, because the collector identifies each exporter based on the source IP address of the network flow data packets, it is not possible to simply export network flow data from individual exporters, as the data from each exporter can appear as though emanating from separate, multiple DVSs rather than as part of a single DVS. This in turn implies that the user may lose flexibility of monitoring the traffic across a DVS.

To address the scalability issue, one approach (in the context of network flow activities) is to force exporters to "assume" the same identity. For example, by using the same IP address for exporting data (e.g., spoofing IP address), the received packets at the collector "appear" to be coming from one source even though in reality the packets are coming from various distributed hosts. However, such "spoofing" is an inherently insecure solution and, furthermore, it encounters problems (e.g., packet dropping) when security mechanisms such as IP source guard or reverse path forwarding (RPF) checks are implemented in the network. Spoofed packets can be dropped and, hence, important statistics can be lost. Moreover, malicious attackers can also send fake data using spoofed IP addresses. There is no way to distinguish valid senders from fake senders. Thus, spoofing may cause the network to be vulnerable to masquerade/replay attacks, which can falsify the statistics gathered.

In yet another example, the network may include logging monitor features (e.g., such as Access Control List (ACL) logging and Address Resolution Protocol (ARP) logging) that provide visibility to network administrators about flows that are permitted or denied (e.g., for having met or violated certain security policies) through the networks. Having a centralized entity (e.g., a switch supervisor) collect the system messages corresponding to these flows from the LCs in the network, and then ship them to an external monitoring server (e.g., collector), does not scale well in the DVS scenario. Moreover, if individual exporters send the system messages to the external monitoring server directly, the messages may appear to be from different DVSs rather than be a part of the same DVS. Thus, there is a need to manage these different exporters at the collector so that the collector can better collate the messages as coming from a single DVS. This allows for the reception of meaningful information about the data flows, even across live migrations.

Similarly, certain implementations of a DVS in the context of ACL logging involves sending flow related information from individual exporters directly to the collector and including a "switch supervisor id" (e.g., DVS ID) in the flow tuple information so that the collector can map flows from a single DVS domain. Such a method can introduce a significant security challenge: any malicious entity that learns the DVS ID can transmit false information on behalf of the DVS by embedding the DVS ID in the messages to the collector. There is no way for the collector to distinguish between authorized sources of monitoring information and unauthorized entities, which are sending fake information.

Methods such as IP source guard (IPSG) or RPF checks, which would have prevented spoofing attacks, are no longer effective in current implementations of DVS networks. The distributed exporting model opens vulnerabilities for an attacker to pump false data, or to replay stale data to the collector. The implications of such attacks can be severe, where attackers can adversely affect billing or raise false alarms regarding network attacks.

System 10 is configured to address these issues (and others) in offering a system and method for securing distributed exporting models in a network environment. Embodiments of system 10 provide a mechanism for exchanging secure credentials, and for the delegating of reporting privileges among group members in a secure domain. The secure domain can include, for example, controller 32 and authorized exporters (e.g., such as exporters 34a-c), which can authenticate their updates with the shared secured credentials. A central trusted entity (e.g., controller 32) for DVS 14 may vouch for the authorization of the distributed exporters (e.g., exporters 34a-c) in the secure domain, or the central trusted entity (e.g., controller 32) may distribute the secure credentials to the distributed exporters (e.g., exporters 34a-c) in the secure domain. As used herein, the terminology "secure credentials" includes any information serving to: (1) identify the secure domain (e.g., that includes controller 32 and authorized exporters such as exporters 34a-c); (2) authenticate identities of authorized exporters (e.g., 34a-c) to collector 30; and (3) otherwise offer security information and/or identifiers (e.g., IP addresses, MAC addresses, proprietary identifiers, etc.) to be used in the security and/or authenticating activities discussed herein.

In various embodiments, a control protocol may be established between controller 32 and collector 30. The control protocol format can be flexible and, further, can comprise the following secure credentials: (1) information about DVS 14 (e.g., engine ID, switch ID, etc.), for example, to identify the secure domain; (2) identity of authorized exporters (e.g., 34a-c) such as an IPv4/IPpv6 address, a universally unique identifier, or an X.509 element (e.g., a certificate, an extension, an identifier, a distinguished name, etc.); and (3) relevant aggregated information about DVS 14 with regard to its domain, topology, clients, types of traffic etc. The identity of the network elements can be in a list form, comprising, for example, a list of IP addresses of exporters (e.g., 34a-c) that are authorized to send data on behalf of DVS 14. Collector 30 can use the secure credentials to authenticate exporters 34a-c. For example, collector 30 may drop packets received from IP addresses that are not included in the secure credentials. In some embodiments, the activities of the present disclosure may involve frequent control protocol messages to be exchanged between controller 32 and collector 30 to update group membership information of the secure domain. In certain embodiments, the secure credentials may help to prevent masquerade attacks (e.g., assuming IP spoofing is not feasible in virtual network 12).

Various other formats of secure credentials may be implemented within the broad framework of the present disclosure. For example, controller 32 can identify the secure domain with secure credentials that includes a security certificate (e.g., a pair of public key and matching private key), and then exporters 34a-c can sign the exported data sent to collector 30. The security certificate may comprise a digitally signed statement from controller 32 indicating that the group public key (and other information) of authorized exporters (e.g., 34a-c) has a particular value(s). The group public key may identify DVS 14. Authorized exporters (e.g., 34a-c) may be assigned a corresponding private key by controller 32 (e.g., with a host profile, or via other methods). In one embodiment, private keys may be communicated from controller 32 to exporters 34a-c as part of feature configuration. When new exporters are added to virtual network 12, controller 32 can push the private key information to the new exporters. The individual exporters (e.g., 34a-c) can sign their respective data with the assigned private key before exporting data to collector 30.

A network administrator may configure the security keys (e.g., group public and private keys) on controller 32. The group public key may be communicated to collector 30 as part of the control protocol message exchange (or via any other suitable protocol). Once the exchange is complete, collector 30 may detect any received packets that are unauthorized. The control protocol can also handle periodic updates to the security keys. Authorized exporters (e.g., 34a-c) may digitally sign data (e.g., in data packets) exported to collector 30 with their assigned private keys.

Assume for purposes of illustration that exporter 34a exports data to collector 30. A unique mathematical value (e.g., determined by the exported data) may be calculated using a 'hashing' or 'message authentication' algorithm, and then this hash value may be encrypted with the private key of exporter 34a, creating a digital signature for the specific exported data. The encrypted value (i.e., the digital signature) can be attached to the end of the exported data or sent from exporter 34a as a separate file together with the exported data. As used herein, the term "digital signature" includes any data indicative of the authenticity of a message to which it is attached. The digital signature scheme may consist of three algorithms: (i) a key generation algorithm that selects a private key uniformly at random from a set of possible private keys, where the private keys correspond to a group public key; (ii) a signing algorithm that, given a message (e.g., exported data) and a private key, produces the digital signature; and (iii) a signature verifying algorithm that, given the message, public key and the digital signature, either accepts or rejects the message sender's claim of authenticity. According to embodiments of the present disclosure, controller 32 may generate the private key and group public key; authorized exporters (e.g., 34a-c) may generate the digital signature; and collector 30 may verify the message sender's authenticity based on the digital signature.

Collector 30 may verify the signature on the exported data using the group public key. For example, the group public key can be used to decrypt the hash value that exporter 34a calculated for the exported data. Using the hashing algorithm (e.g., from the security certificate included in the secure credentials), the hash of the exported data may be calculated. The newly calculated hash value may be compared to the hash value from the digital signature (i.e., the value that exporter 34a originally calculated). If the values match, collector 30 can know that the entity (e.g., exporter 34a) controlling the private key corresponding to the public key sent the information. The exported data may be then accepted by collector 30.

In various embodiments, collector 30 may assemble the exported data from various exporters (e.g., 34a-c) and then combine them to produce reports (e.g., that can be used for traffic and security analysis). In some embodiments, exporters 34a-c may periodically push data (e.g., identifying information, which may include traffic data, logging data, or any other suitable data) to collector 30. In other embodiments, exporters 34a-c may push data comprising identifying information when polled by collector 30. Collector 30 may create real time or historical reports containing network flow records to define the information gathered from various exporters 34a-c.

Embodiments of system 10 may enable a secure and scalable method to export network flow and monitoring data directly from exporters in a DVS network environment. In many embodiments, the control protocol between controller 32 and collector 30 may be simple and readily extended to convey additional information (e.g., tenant specific information in a multi-tenant, cloud service provider scenario, etc.) between controller 32 and collector 30 (and potentially other monitoring servers in system 10).

Turning to the infrastructure of system 10, the network topology can include any number of servers, VMs, DVSs, virtual routers, VSMs, exporters, controllers, collectors, and other nodes interconnected to form a large and complex virtual network 12. Elements of FIG. 1 may be coupled to one another through one or more interfaces employing any suitable connection (wired or wireless), which provides a viable pathway for electronic communications. Additionally, any one or more of these elements may be combined or removed from the architecture based on particular configuration needs. System 10 may include a configuration capable of transmission control protocol/Internet protocol (TCP/IP) communications for the electronic transmission or reception of data packets in a network. System 10 may also operate in conjunction with a User Datagram Protocol/Internet Protocol (UDP/IP) or any other suitable protocol, where appropriate and based on particular needs. In addition, gateways, routers, switches, and any other suitable nodes (physical or virtual) may be used to facilitate electronic communication between various nodes in the network.

Note that the numerical and letter designations assigned to the elements of FIG. 1 do not connote any type of hierarchy; the designations are arbitrary and have been used for purposes of teaching only. Such designations should not be construed in any way to limit their capabilities, functionalities, or applications in the potential environments that may benefit from the features of system 10. It should be understood that the architecture shown in FIG. 1 is simplified for ease of illustration. For example, virtual network 12 may comprise access switches, aggregation switches, core switches to aggregate and distribute ingress (upstream traffic), and egress (downstream traffic) traffic, etc. A plurality of switches (virtual and/or physical) may be provided at each access, aggregation, and core level to achieve redundancy within virtual network 12. Further, virtual network 12 may include elements particular to the type of network services provided; for example, in data centers that provide mass storage, virtual network 12 may include Storage Area Networks (SANs). Further, in a virtualized environment like that of system 10, network flows may be monitored between each virtual device (e.g., VM-to-VM traffic flows). The host servers (e.g., servers 16a-c) may readily support thousands of such flows.

The example network environment may be configured over a physical infrastructure that may include one or more networks and, further, may be configured in any form including, but not limited to, local area networks (LANs), wireless local area networks (WLANs), VLANs, metropolitan area networks (MANs), wide area networks (WANs), VPNs, Intranet, Extranet, any other appropriate architecture or system, or any combination thereof that facilitates communications in a network. In some embodiments, a communication link may represent any electronic link supporting a LAN environment such as, for example, cable, Ethernet, wireless technologies (e.g., IEEE 802.11x), ATM, fiber optics, etc. or any suitable combination thereof. In other embodiments, communication links may represent a remote connection through any appropriate medium (e.g., digital subscriber lines (DSL), telephone lines, T1 lines, T3 lines, wireless, satellite, fiber optics, cable, Ethernet, etc. or any combination thereof) and/or through any additional networks such as a wide area networks (e.g., the Internet).

In various embodiments, networks 26 and collector 30 may form a part of a single private enterprise network such as a data center network. In other embodiments, networks 26 may be an external network such as the Internet, and collector 30 may be provisioned inside the external network, or in another third-party network. In various embodiments, collector 30 may implement a scalable multitier architecture for collecting, normalizing, correlating, and aggregating data from network devices dispersed across geographically distributed networks. Collector 30 may be integrated with syslog capabilities, for example, provisioned in a syslog server. Collector 30 may collect data from one or more networks including virtual network 12. Collector 30 may be implemented on a server, a router, a switch, or similar suitable network element that can support network flow aggregation and/or data collection.

Exporters 34*a-c* may represent physical ports of the respective host servers 16*a-c*. Each exporter 34*a-c* may carry the IP address of respective VEM 18*a-c*, and may be bound to a respective virtual Ethernet port within DVS 14. In some embodiments, exporters 34*a-c* may be physical hardware devices, while in other embodiments, exporters 34*a-c* may be virtual hardware devices such as virtual network interface cards that can leverage functionalities offered by associated physical network interface cards. In various embodiments, each VM 20*a-c* may instantiate a virtual network interface card loaded with respective exporters 34*a-c* logically and, further, connect to DVS 14 in order to send and receive network traffic.

Figure 2:
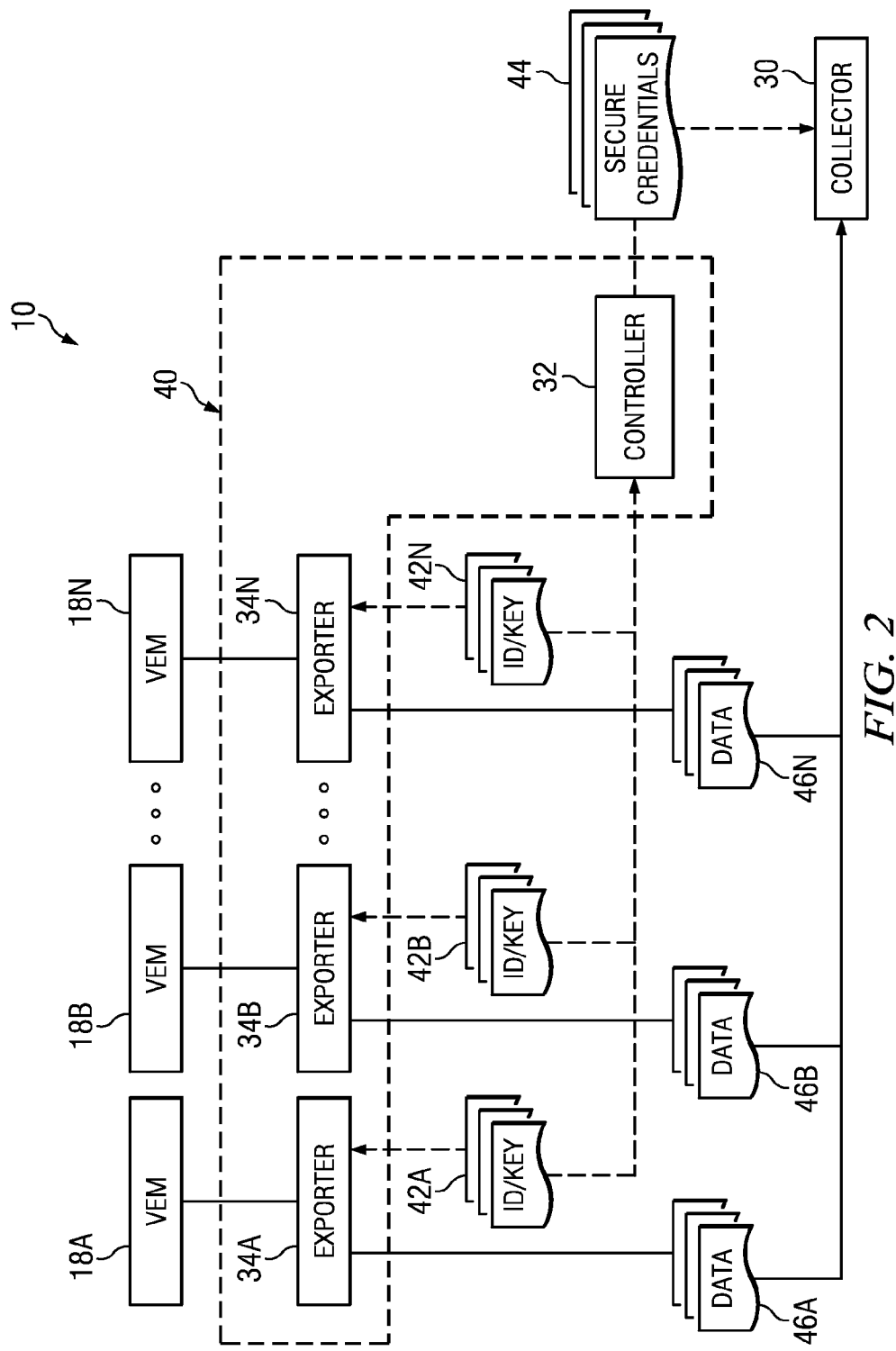
FIG. 2 is a simplified block diagram illustrating example details of the system in accordance with one embodiment.

Turning to FIG. 2, FIG. 2 is a simplified block diagram illustrating additional details of system 10 according to an embodiment of the present disclosure. VEMs 18*a*, 18*b* . . . 18*n* may be associated with corresponding exporters 34*a*, 34*b* . . . 34*n*, respectively. Exporters 34*a-n* may communicate with controller 32, together with which, they form part of a secure domain 40 of DVS 14. According to an embodiment of the present disclosure, exporters 34*a-n* may communicate ID/key information 42*a-n*, respectively, with controller 32. For example, exporters 34*a-n* may provide identity information (e.g., IP address) to controller 32. In another example, controller 32 may assign private keys that form part of a public-private cryptographic key pair to exporters 34*a-n*.

Controller 32 may identify exporters 34*a-n*, and generate secure credentials 44 of secure domain 40. Secure credentials 44 may include, for example, a list of IP addresses of exporters 34*a-n*. In another example, secure credentials 44 may include a certificate with a public key corresponding to private keys provided to exporters 34*a-n*. Controller 32 may communicate secure credentials 44 of secure domain 40 to collector 30 in a control protocol. Exporters 34*a-n* may export data 46*a-n* to collector 30. Each data 46*a-n* may include identifying information (i.e., any information that serves to identify respective exporter 34*a-n* exporting data 46*a-n*). For example, data 46*a* may include identifying information that includes the IP address of exporter 34*a*. In another example, data 46*a* may be digitally signed by exporter 34*a* using the appropriate private key assigned to exporter 34*a* by controller 32. The identifying information may comprise a digital signature created with the private key. In some embodiments, the identifying information may be part of data packets of data 46*a-n*. In other embodiments, the identifying information may be included in a separate file sent with data 46*a-n*.

Data 46*a-n* may comprise network traffic information, ACL logging information, and any other appropriate information for virtual network 12 such as: source and destination MAC addresses; source and destination IPv4 or IPv6 addresses; source and destination TCP/UDP ports; type of service (ToS); Differentiated Services Code Point (DSCP); packet and byte counts; flow timestamps; input and output interface numbers; TCP flags and encapsulated protocol (TCP/UDP) and individual TCP Flags; sections of packet for deep packet inspection; fields in IPv4 Header including IP-ID, TTL and others; fields in IPv6 Header including Flow Label, Option Header and others; routing information (next-hop address, source autonomous system (AS) number, destination AS number, source prefix mask, destination prefix mask, BGP Next Hop, BGP Policy Accounting traffic index); syslog messages; etc. Data 46*a-n* may be in any suitable format, including IP, UDP, Stream Control Transmission Protocol (SCTP), etc., and, further, may include headers, payload, trailers, etc. as appropriate, and potentially based on particular needs.

In various embodiments, collector 30 may verify the identifying information in data that it receives (e.g., including data 46*a-n*) with secure credentials 44. If the identifying information in each data, including data 46*a-n*, is validated by secure credentials 44 to indicate that each data, including each of data 46*a-n*, is from an authorized exporter (e.g., one or more of exporters 34*a-n*), respective data (e.g., including validated data 46*a-n*) may be accepted by collector 30. Otherwise, if the identifying information in any of the received data is not validated by secure credentials 44, then the data may be rejected, for example, by silently dropping data packets that comprise the invalidated data.

Figure 3:
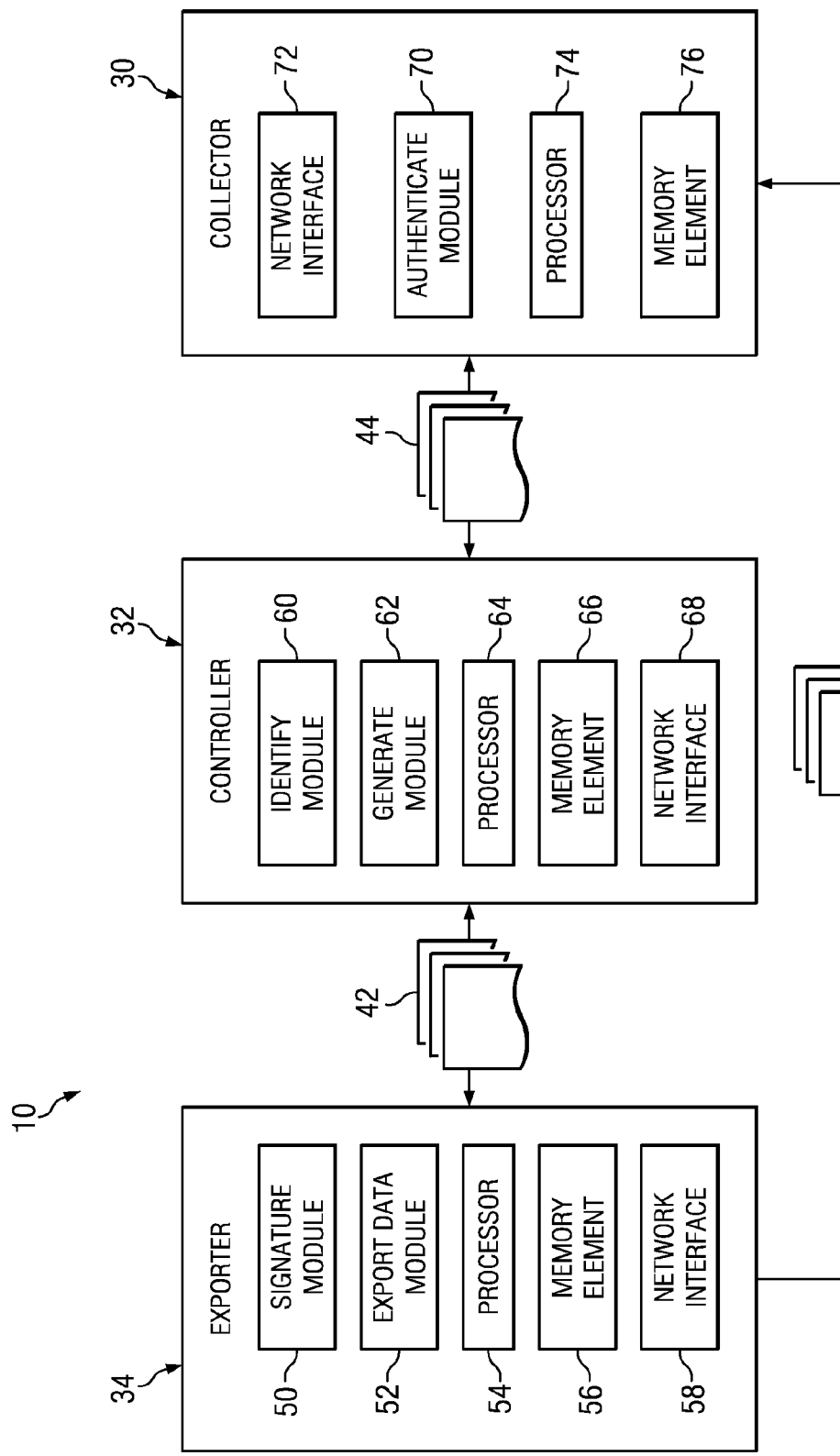
FIG. 3 is a simplified block diagram illustrating further example details of the system in accordance with one embodiment.

Turning to FIG. 3, FIG. 3 is a simplified block diagram illustrating additional details of system 10. Exporter 34 and controller 32 may be part of secure domain 40 of DVS 14. Exporter 34 may include a signature module 50, an export data module 52, a processor 54, a memory element 56, and a network interface 58. In some embodiments, exporter 34 may access processor 54 and memory element 56 from another location (for example, in a host server). Controller 32 may include an identify module 60, a generate module 62, a processor 64, a memory element 66, and a network interface 68. In some embodiments, controller 32 may access processor 64 and memory element 66 from another location (for example, in the host server). Collector 30 may include an authenticate module 70, a network interface 72, a processor 74, and a memory element 76. In some embodiments, collector 30 may access processor 74 and memory element 76 from another location (for example, in the host server or router).

Network interfaces 58, 68, and 72 may be coupled to respective processors 54, 64, and 74, and may be configured to transmit and receive messages over one or more networks (e.g., virtual network 12 and networks 26). Such network interfaces 58, 68, and 72 may be inclusive of physical ports (e.g., Ethernet, USB, HDMI, etc.), interfaces for wired and wireless internal subsystems, and the like, and multiple wireless interfaces (e.g., WiFi, WiMAX, 3G, 4G, white space, 802.11x, satellite, Bluetooth, near field communication (NFC), Long Term Evolution (LTE), GSM/WCDMA/HSPA, CDMA1x/EVDO, DSRC, CAN, GPS, etc.).

According to one embodiment, exporter 34 may provide ID/Key information 42 that includes, for example, the IPv4/IPv6 address of exporter 34, to controller 32. Identify module 62 may aggregate ID/key information 42 from multiple exporters in secure domain 40 and identify substantially all authorized exporters in secure domain 40. Generate module 62 may generate secure credentials 44 by aggregating ID/key information 42, for example, into a list of IP addresses. In another example, generate module 62 may generate a security certificate with a public key having corresponding private keys. Controller 32 may communicate the private key information using ID/key information 42 to exporter 34. Controller 32 may communicate secure credentials 44 to collector 30.

Signature module 50 of exporter 34 may insert identifying information into data to be exported to collector 30. Export data module 52 of exporter 34 may send data 46 including the identifying information to collector 30. In various embodiments, export data module 52 may include a destination IP address, source interface, UDP port number (e.g., where collector 30 is listening), export format and other details into data 46. Authenticate module 70 of collector 30 may validate the identifying information with secure credentials 44. For example, if the identifying information comprises the IP address of exporter 34, authenticate module 70 may validate the IP address with the list of IP addresses in secure credentials 44. Collector 30 may accept data 46 if the IP address is found in the list of IP addresses; otherwise, data 46 may be rejected.

In another example embodiment, signature module 50 may create a digital signature using the private key from ID/key information 42 and sign data 46 with the digital signature. For example, signature module 50 may compute a cryptographically secure hash of data 46. The digital signature may be created by encrypting the hash using the private key. Data 46 may be signed with the digital signature, for example, by including the digital signature in data 46, or by transmitting the digital signature as a separate file included with data 46, or by other suitable methods. Export data module 52 may send signed data 46 including the identifying information (e.g., digital signature) to collector 30. Authenticate module 70 may attempt to verify the identifying information in data 46 using the public key from secure credentials 44. For example, authenticate module 70 may compute a hash value of data 46, and decrypt the hash value in the digital signature using the group public key. If the hash values match, data 46 may be accepted; otherwise, data 46 may be rejected.

The various modules in system 10, including signature module 50, export data module 52, identify module 60, generate module 62, and authenticate module 70 may encompass applications (e.g., computer programs), scripts, middleware, system software, data structures, algorithms, and other computer programs that may be implemented on suitable hardware such as servers, routers, and other network elements to facilitate the respective operations described herein.

Figure 4:
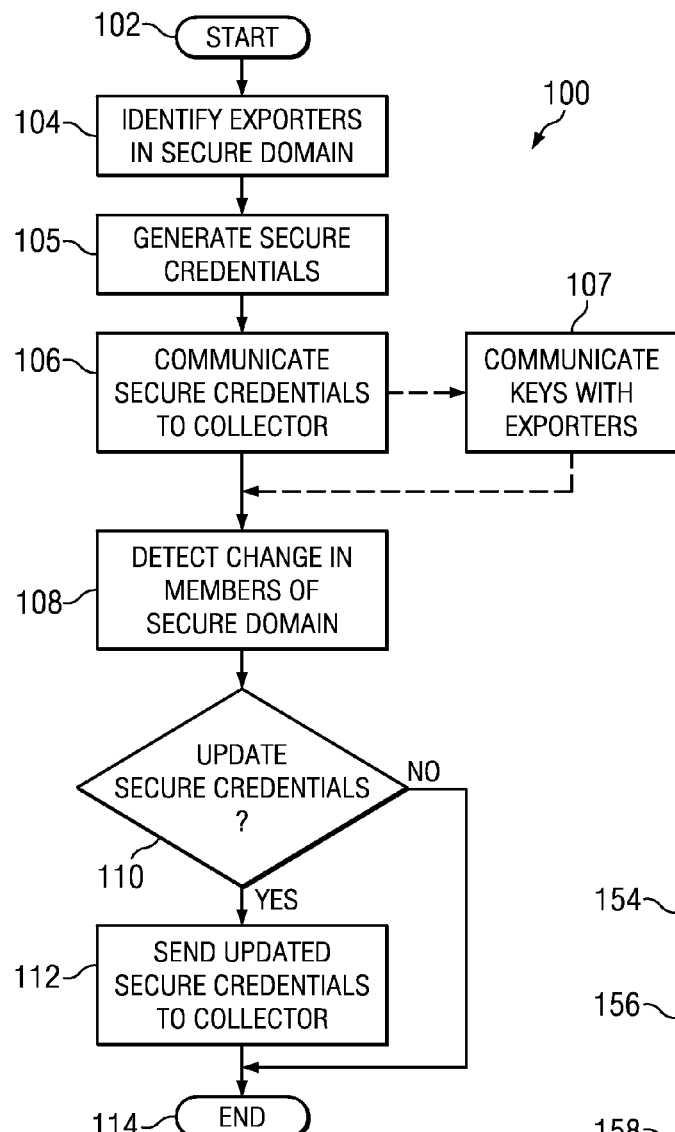
FIG. 4 is a simplified flow diagram illustrating example operations that may be associated with an embodiment of the system.

Turning to FIG. 4, FIG. 4 is a simplified flowchart 100 illustrating operational steps that may be associated with embodiments of the present disclosure. The activities may start at 102, when controller 32 is activated, for example, via VSM 22. At 104, controller 32 may identify substantially all authorized exporters (e.g., 34a-n) of secure domain 40. At 105, controller 32 may generate secure credentials 44. At 106, controller 32 may communicate secure credentials 44 to collector 30 using any suitable control protocol. In certain embodiments, and as reflected at 107, controller 32 may communicate keys with authorized exporters 34a-n. These functions may be implemented in embodiments where controller 32 generates a security certificate with a group public key and corresponding private key.

At 108, a change in membership of secure domain 40 may be detected. In one example, the change may be detected when a network administrator manually adds a new virtual network interface card, or replaces, deletes, or moves an existing virtual network interface card, etc. through a suitable management module in VSM 22. In another example, the change may be detected automatically by VSM 22. In yet another example, the new exporter (or corresponding VEM) may push the change information to VSM 22. At 110, a determination is made whether secure credentials 44 should be updated. In an example embodiment, where secure credentials 44 comprise IP address of individual exporters, secure credentials 44 may be updated to reflect the change in IP address due to the change in members of secure domain 40. Secure credentials 44 may be suitably updated at 112 by sending new (or updated) secure credentials 44 to collector 30. In another example embodiment, where secure credentials 44 comprise a security certificate with public and private keys, a change in members of secure domain 40 may not require any update to secure credentials 44. Thus, an update may not be performed, and step 112 may be bypassed. The operations may end, or be recycled at 114.

Figure 5:
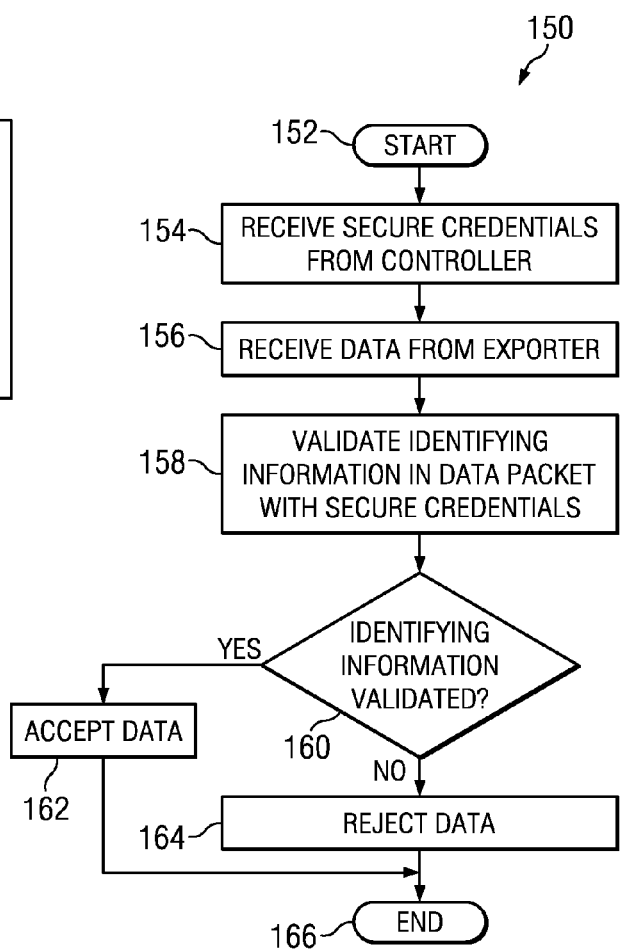
FIG. 5 is a simplified flow diagram illustrating further example operations that may be associated with an embodiment of the system.

Turning to FIG. 5, FIG. 5 is a simplified flowchart 150 illustrating operational steps that may be associated with embodiments of the present disclosure. The operations may start at 152, when collector 30 is activated. At 154, secure credentials 44 may be received from controller 32. At 156, data 46 may be received, for example, from exporter 34. Data 46 may include identifying information such as a digital signature with a private key corresponding to a group public key, or IP address of exporter 34, etc. At 158, identifying information in data 46 may be validated with secure credentials 44. At 160, a determination may be made whether the identifying information is validated. For example, the identifying information may be validated if the digital signature with the private key matches the public key information in secure credentials 44. In another example, the identifying information may be validated if the IP address of the source of data 46 is found in the list of IP addresses of authorized exporters in secure credentials 44. If the identifying information is validated, data 46 may be accepted at 162; otherwise, data 46 may be rejected at 164. The operations may end, or be recycled at 166.

Note that in this Specification, references to various features (e.g., elements, structures, modules, components, steps, operations, characteristics, etc.) included in "one embodiment", "example embodiment", "an embodiment", "another embodiment", "some embodiments", "various embodiments", "other embodiments", "alternative embodiment", and the like are intended to mean that any such features are included in one or more embodiments of the present disclosure, but may or may not necessarily be combined in the same embodiments. Note also that an 'application' as used herein this Specification, can be inclusive of an executable file comprising instructions that can be understood and processed on a computer, and may further include library modules loaded during execution, object files, system files, hardware logic, software logic, or any other executable modules.

In example implementations, at least some portions of the activities outlined herein may be implemented in software, for example, provisioned as part of collector 30, controller 32, and/or exporter 34. In certain embodiments, one or more of these features may be implemented in hardware, provided external to these elements, or consolidated in any appropriate manner to achieve the intended functionality. The various network elements (e.g., collector 30, controller 32, and exporter 34) may include software (or reciprocating software) that can coordinate in order to achieve the operations as outlined herein. In still other embodiments, these elements may include any suitable algorithms, hardware, software, components, modules, interfaces, or objects that facilitate the operations thereof.

Furthermore, collector 30, controller 32, and/or exporter 34 described and shown herein (and/or their associated structures) may also include suitable interfaces (e.g., network interfaces 58, 68, 72) for receiving, transmitting, and/or otherwise communicating data or information in a network environment. Additionally, some of the processors and memory elements associated with the various nodes may be removed, or otherwise consolidated such that a single processor and a single memory element are responsible for certain activities. In a general sense, the arrangements depicted in the FIGURES may be more logical in their representations, whereas a physical architecture may include various permutations, combinations, and/or hybrids of these elements. It is imperative to note that countless possible design configurations can be used to achieve the operational objectives outlined here. Accordingly, the associated infrastructure has a myriad of substitute arrangements, design choices, device possibilities, hardware configurations, software implementations, equipment options, etc.

In some of example embodiments, one or more memory elements (e.g., memory elements 56, 66, 76) can store data used for the operations described herein. This includes the memory element being able to store software instructions (e.g., logic, code, etc.) in non-transitory media such that the instructions are executed to carry out the activities described in this Specification. A processor can execute any type of instructions associated with the data to achieve the operations detailed herein in this Specification. In one example, processors (e.g., 54, 64, 74) could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array (FPGA), an erasable programmable read only memory (EPROM), an electrically erasable programmable read only memory (EEPROM)), an ASIC that includes digital logic, software, code, electronic instructions, flash memory, optical disks, CD-ROMs, DVD ROMs, magnetic or optical cards, other types of machine-readable mediums suitable for storing electronic instructions, or any suitable combination thereof.

In operation, components in system 10 can include one or more memory elements (e.g., memory elements 56, 66, 76) for storing information to be used in achieving operations as outlined herein. These devices may further keep information in any suitable type of non-transitory storage medium (e.g., random access memory (RAM), read only memory (ROM), field programmable gate array (FPGA), erasable programmable read only memory (EPROM), electrically erasable programmable ROM (EEPROM), etc.), software, hardware, or in any other suitable component, device, element, or object where appropriate and based on particular needs. The information being tracked, sent, received, or stored in system 10 could be provided in any database, register, table, cache, queue, control list, or storage structure, based on particular needs and implementations, all of which could be referenced in any suitable timeframe. Any of the memory items discussed herein should be construed as being encompassed within the broad term 'memory element.' Similarly, any of the potential processing elements, modules, and machines described in this Specification should be construed as being encompassed within the broad term 'processor.'

It is important to note that the operations and steps described with reference to the preceding FIGURES illustrate only some of the possible scenarios that may be executed by, or within, the system. Some of these operations may be deleted or removed where appropriate, or these steps may be modified or changed considerably without departing from the scope of the discussed concepts. In addition, the timing of these operations may be altered considerably and still achieve the results taught in this disclosure. The preceding operational flows have been offered for purposes of example and discussion. Substantial flexibility is provided by the system in that any suitable arrangements, chronologies, configurations, and timing mechanisms may be provided without departing from the teachings of the discussed concepts.

Although the present disclosure has been described in detail with reference to particular arrangements and configurations, these example configurations and arrangements may be changed significantly without departing from the scope of the present disclosure. For example, although the present disclosure has been described with reference to particular communication exchanges involving certain network access and protocols, system 10 may be applicable to other exchanges or routing protocols. Moreover, although system 10 has been illustrated with reference to particular elements and operations that facilitate the communication process, these elements, and operations may be replaced by any suitable architecture or process that achieves the intended functionality of system 10.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

What is claimed is:

1. A method, comprising:
   identifying, by a controller in a distributed virtual switch (DVS) network environment, a plurality of exporters that are distributed across the network environment and are authorized to communicate network flow data to a collector on behalf of the secure domain;
   generating, by the controller, secure credentials for plurality of exporters of the secure domain;
   communicating, by the controller, the secure credentials to the collector; and
   wherein the secure credentials are adapted to be used by the collector to authenticate the exporters.

2. The method of claim 1, further comprising:
   receiving, by the collector, the secure credentials;
   receiving, by the collector, certain data that includes identifying information, which further includes an Internet protocol (IP) address of a source associated with the certain data;
   accepting, by the collector, the certain data if the secure credentials validate the identifying information; and
   rejecting, by the collector, the certain data if the secure credentials do not validate the identifying information.

3. The method of claim 2, wherein the secure credentials comprise a list of Internet Protocol (IP) addresses of the exporters, and wherein the secure credentials validate the identifying information if the IP address of the source is included in the list of IP addresses.

4. The method of claim 3, wherein objects in the list reflect a selected one of a group of elements, the group consisting of:
   (a) an IPv4 address;
   (b) an IPv6 address; and
   (c) an X.509 element.

5. The method of claim 1, wherein the secure credentials comprise a security certificate with a group public key identifying the secure domain, and wherein a digital signature is created with a private key, and wherein the secure credentials validate identifying information that is received if the digital signature can be verified with the group public key.

6. The method of claim 5, further comprising:
communicating, by the controller, the private key to the exporters, wherein the exporters are configured for:
storing the private key;
creating the digital signature with the private key; and
signing the data with the digital signature.

7. The method of claim 5, wherein the private key is communicated as part of a feature configuration of the exporters.

8. The method of claim 1, wherein the controller is associated with a virtual supervisor module (VSM), and wherein the exporters are associated with respective virtual Ethernet modules (VEMs) in the DVS network environment.

9. Logic encoded in non-transitory computer readable media that includes instructions for execution and when executed by a processor, is operable to perform operations, comprising:
identifying, using a controller in a distributed virtual switch (DVS) network environment, a plurality of exporters that are distributed across the network environment and are authorized to communicate network flow data to a collector on behalf of the secure domain;
generating, using the controller, secure credentials for the plurality of exporters of the secure domain;
communicating, using the controller, the secure credentials to the collector; and
wherein the secure credentials are adapted to be used by the collector to authenticate the exporters.

10. The logic of claim 9, the operations further comprising:
receiving, using the collector, the secure credentials;
receiving, using the collector, certain data that includes identifying information, which further includes an Internet protocol (IP) address of a source associated with the certain data;
accepting, using the collector, the certain data if the secure credentials validate the identifying information; and
rejecting, using the collector, the certain data if the secure credentials do not validate the identifying information.

11. The logic of claim 10, wherein the secure credentials comprise a list of Internet Protocol (IP) addresses of the exporters, and wherein the secure credentials validate the identifying information if the IP address of the source is included in the list of IP addresses.

12. The logic of claim 9, wherein the secure credentials comprise a security certificate with a group public key identifying the secure domain, and wherein a digital signature is created with a private key, and wherein the secure credentials validate identifying information that is received if the digital signature can be verified with the group public key.

13. The logic of claim 12, the operations further comprising:
communicating, using the controller, the private key to the exporters, wherein the exporters are configured for:
storing the private key;
creating the digital signature with the private key; and
signing the data with the digital signature.

14. The logic of claim 12, wherein the private key is communicated as part of a feature configuration of the exporters.

15. The logic of claim 9, wherein the controller is associated with a virtual supervisor module (VSM), and wherein the exporters are associated with respective virtual Ethernet modules (VEMs) in the DVS network environment.

16. A controller in a distributed virtual switch (DVS) network environment, comprising:
an identify module coupled to a generate module;
a network interface configured for communicating information in a network;
a memory element for storing instructions; and
a processor operable to execute the instructions such that the controller is configured for:
identifying, using the identify module, a plurality of exporters that are distributed across the network environment and are authorized to communicate network flow data to a collector on behalf of a secure domain;
generating, using the generate module, secure credentials for the plurality of exporters of the secure domain;
communicating, using the network interface, the secure credentials to the collector; and
wherein the secure credentials are adapted to be used by the collector to authenticate the exporters.

17. The controller of claim 16,
wherein the collector is configured to:
receiving the secure credentials;
receiving certain data that includes identifying information, which further includes an Internet protocol (IP) address of a source associated with the certain data;
accepting the certain data if the secure credentials validate the identifying information; and
rejecting the certain data if the secure credentials do not validate the identifying information.

18. The controller of claim 16, wherein the secure credentials comprise a security certificate with a group public key identifying the secure domain, and wherein a digital signature is created with a private key, and wherein the secure credentials validate identifying information that is received if the digital signature can be verified with the group public key.

* * * * *